Dec. 15, 1970 SHIGETAKE YOSHIMURA 3,546,878
ROTARY ENGINE WITH SECONDARY AIR INJECTING MEANS TO
OXIDIZE UNBURNED EXHAUST GASES
Filed April 10, 1969 4 Sheets-Sheet 1

INVENTOR

SHIGETAKE YOSHIMURA

BY *Sughrue, Rothwell, Mion, Zinn & Macpeak*

ATTORNEYS.

United States Patent Office 3,546,878
Patented Dec. 15, 1970

3,546,878
ROTARY ENGINE WITH SECONDARY AIR INJECTING MEANS TO OXIDIZE UNBURNED EXHAUST GASES
Shigetake Yoshimura, Hiroshima-shi, Hiroshima, Japan, assignor to Toyo Kogyo Company Limited, Hiroshima, Japan
Filed Apr. 10, 1969, Ser. No. 814,984
Claims priority, application Japan, May 25, 1968, 43/35,639
Int. Cl. F01m 3/10; F02b 53/04, 55/16
U.S. Cl. 60—30    8 Claims

ABSTRACT OF THE DISCLOSURE

A rotary piston internal combustion engine having an epitrochoidal casing with flat side walls and a rotary piston disposed therein which is triangular in shape and rotated in a planetary movement, carries a plurality of nozzles for sequentially ejecting secondary air into an operating chamber with the rotary piston first opening the radially innermost or outermost nozzle during planetary movement.

BACKGROUND OF THE INVENTION

Field of the invention

This invention relates to rotary piston interal combustion engines and more particularly to an internal combustion engine of this type which eliminates the unburned detrimental components such as carbon monoxide and hydrocarbon in the exhaust gas by oxidizing and burning the same through the ejection of secondary air into the operating chamber of the engine.

Description of the prior art

In general, it is desirable to keep the temperature of the exhaust gas as high as possible where secondary air is ejected into the gas in order to oxidize and burn the unburned components by re-igniting the exhaust gas directly from the temperature of the gas being exhausted. On the other hand, and in order to accomplish complete mixing and contact between the injected secondary air and the unburned components of the exhaust gas, the greater the amount of secondary air supplied the better oxidation is performed. If the secondary air is, however, in excess of the required amount, the temperature of the exhaust gas is lowered with the result that the unburned components of the gas are prevented from being oxidized and ignited. This means that in order to complete the oxidation of the unburned components in the exhaust gas, secondary air should be supplied to the exhaust gas at high temperature and in such an amount that it will not appreciably lower the temperature of the exhaust gas.

SUMMARY OF THE INVENTION

The present invention eliminates the aforementioned disadvantages of conventional rotary piston internal combustion engines and thus provides a novel and improved engine of this type. According to one aspect of the present invention, a rotary piston internal combustion engine has a peripheral housing with an epitrochoidal inner surface and side walls disposed on both sides of the peripheral housing. A rotary piston including three arcuate flanks of triangular shape is positioned therein and adapted to rotate under planetary rotation by supporting the same by means of an eccentric shaft. In a conventional manner, an apex seal, a side seal and a corner seal keep the contact areas airtight between the casing and the rotary piston. Further an oil seal is carried by the rotary piston in such a manner as to surround the central opening of the rotary piston so as to prevent oil from leaking radially outward through the space between the side walls and the rotary piston. Suction and exhaust ports are provided at predetermined locations within the casing as is an ignition plug in a conventional manner.

The present invention is directed to a plurality of nozzles which are provided for injecting secondary air into the chamber formed between the rotating piston and the casing wall. The nozzles are positioned in such a manner such that they lie outside the trace line of the piston oil seal which is drawn on the inner surface of the side wall when the rotary piston rotates, so as not to eject secondary air into the space interiorly of the oil seal. The nozzles are also positioned in such a manner that they open in turn, that is, sequentially from the nozzle disposed radially innermost with respect to the rotary piston and they close thereby in turn when the rotary piston rotates further, from the innermost nozzle outwards in a radial manner. The nozzles are also arranged such that the innermost nozzle opens at the same time that the exhaust port opens as a result of rotation of the rotary pistons. As thus constructed, the arrangement delivers a highly suitable secondary air supply into the operating chamber so as to oxidize and thus burn the unburned components of the exhaust gas.

According to another aspect of the present invention, a rotary piston internal combustion engine is provided, which is very similar to the first embodiment but in which the disposition of the nozzles is such that they open from the nozzle disposed radially outermost with respect to the rotating piston during rotation of the same in planetary movement.

Thus, the rotary piston internal combustion engine of the present invention exhausts combustion gases in which complete combustion is assured. The means for completely oxidizing and causing the unburned components to burn in the exhaust gas prior to exhausting the same is extremely simple and the rotary piston itself causes delivery of the proper supply of air to completely burn the unburned components.

DESCRIPTION OF THE PREFERRED EMBODIMENT

Figure 1:
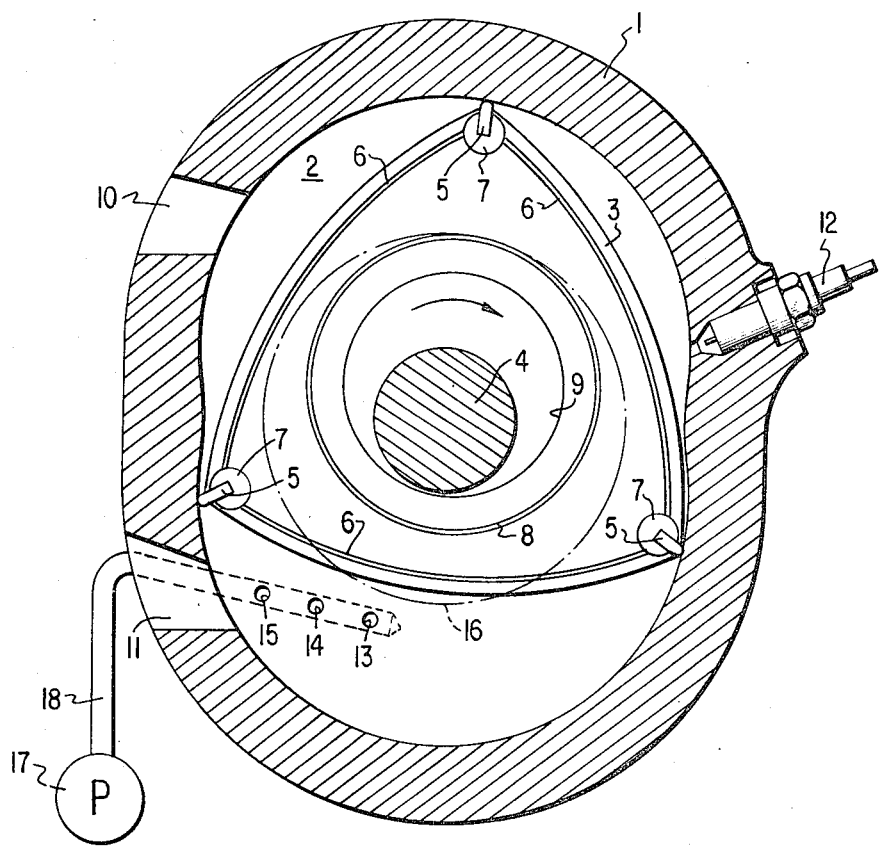
FIG. 1 is a vertical sectional view of a rotary piston internal combustion engine according to one embodiment of the present invention.

Referring to FIG. 1, a rotary piston internal combustion engine according to one embodiment of the present invention includes a peripheral housing 1 having an epitrochoidal inner surface. A side wall of housing 2 is disposed on both sides of the peripheral housing 1. A rotary piston 3 which includes three arcuate flanks and forming in cross-section a triangle, rotates in such a manner under planetary motion by being supported by an eccentric shaft 4. The rotary piston moves within the casing consisting of the peripheral housing and the side walls. Apex seals 5, side seals 6 and corner seals 7 maintain airtight chambers between the casing and the rotary piston. An oil seal 8 is fixed to the rotary piston 3 in such a manner as to surround a central opening 9 so as to prevent oil from leaking radially outwards through the space between the side walls 2 and rotary piston 3. Within suitable locations within the casing 1, there are provided suction and exhaust ports 10 and 11 respectively. Further, an ignition plug 12 is carried within the casing wall 1.

The present invention is directed to the provision of a plurality of nozzles 13, 14 and 15, respectively, which inject secondary air into the chamber formed by casing 1 and the two side walls 2. The nozzles are provided on the inner surface of the side walls 2 or on both side walls in such a manner that they open up into the chamber to the outside of the trace 16 which oil seal 8 carried by the rotary piston 3 draws on the inner surface of the side wall during rotation of the rotary piston 3. This is so as not to eject air into the inner space of the oil seal. Further, the nozzles 13 and 15 are in alignment and so disposed radially that nozzle 13 which is disposed radially innermost, is opened first during rotation of the piston 3 and in turn nozzles 14 and 15, since the rotary piston 3 rotates in a planetary movement and they close in turn when the rotary piston 3 rotates further. The arrangement is such that nozzle 13 starts to open at the same time that the exhaust port 11 is opened by movement of the rotary piston 3 thereacross. An air pump 17 supplies secondary air through conduit 18 which is fluid-coupled to all three nozzles 13, 14 and 15.

Referring next to FIGS. 2 through 5, the operation of the rotary piston internal combustion engine in the form of the first embodiment of the present invention may be readily seen. The rotary piston internal combustion engine operates in repetitive steps in such a manner that it intakes at first, an operating fluid (fuel and air mixture) from suction port 10 and compresses the fluid which is thereafter ignited by the ignition plug 12 whereupon the hot combustion gases expand driving the rotary piston in the direction of the arrow shown, which gases are then exhausted through exhaust port 11. To this extent the operation is conventional.

Figure 2:
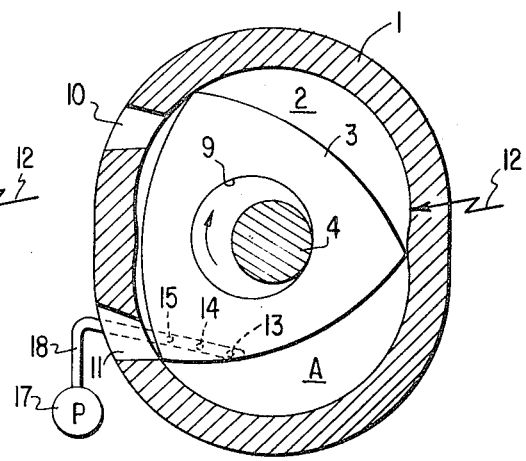
FIG. 2 is a diagrammatic view of the engine shown in FIG. 1 with the innermost secondary air nozzle just opening under rotation of the piston.

Referring particularly to FIG. 2, when an operating chamber A is at the position shown and at the end of its expansion step, the nozzles 13, 14 and 15 are closed from the chamber by the rotary piston C so that secondary air which is continuously being pumped by means 17 is not injected through the nozzles and into the operating chamber A.

Figure 3:
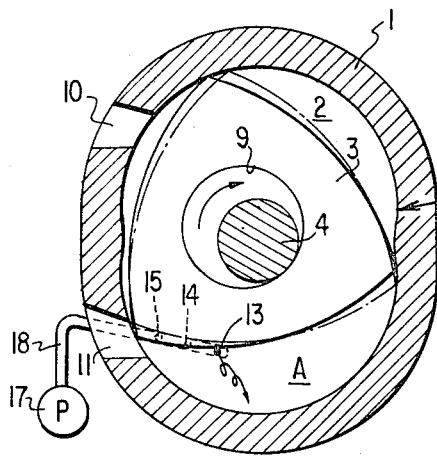
FIG. 3 is a view similar to that of FIG. 2 with the intermediate nozzle just opening.

Referring next to FIG. 3, further movement of piston 3 in a clockwise direction opens the exhaust port 11 with respect to chamber A and the gases start exhausting through port 11. At the same time, nozzle 13 opens so that pressurized secondary air is injected into the operating chamber A at the same time that the exhaust port 11 opens. However, nozzles 14 and 15 are still closed. Since the amount of air injected into the chamber A is small at this moment, the secondary air prevents the obstruction of the oxidation or burning of the unburned components due to the injection of a too large amount of secondary air, abruptly into the chamber at the same time that the combustion products start to exhaust from the chamber. Since the temperature of the gas being exhausted is not reduced appreciably, the unburned component in the gas to be exhausted is easily re-ignited by means of the secondary air ejected through nozzle 13 and the high temperature of the exhaust gas causes ready oxidation and burning of the same. Further, upon oxidation due to re-ignition of the exhaust gas, this in itself increases the temperature of the gases within chamber A due to the oxidizing energy released. This prevents the temperature of the exhaust gases from lowering appreciably and they continue the positive burning of the unburned components even when nozzles 14 and 15 sequentially open thereafter, as indicated by the broken line in FIG. 3, with the rotary piston 3 rotating to a position such that all of the nozzles 13, 14 and 15 are open to inject a large amount of secondary air into operating chamber A. Of course, as the exhaust step of the combustion cycle of the engine continues to advance, the exhaust gases within the operating chamber A are readily exhausted through the exhaust port 11 with the result that the amount of exhaust gas within chamber A is appreciably reduced. When secondary air is ejected through nozzles 13, 14 and 15, in this position, an excess amount of secondary air may be accumulated within chamber A so as to appreciably lower the temperature of the exhaust gases and prevent the further oxidation of unburned components.

Figure 4:
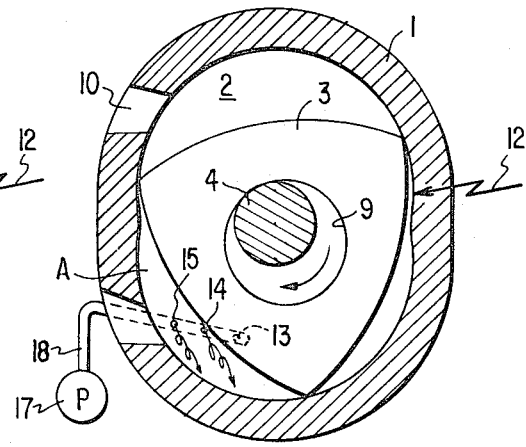
FIG. 4 is a view similar to that of FIG. 2 with the innermost nozzle just closed.

However, as shown in FIG. 4 and in order to prevent such a detrimental occurrence as that described above, the present invention, due to the radial positioning of nozzles 13, 14 and 15 allows the nozzle 13, which is disposed radially innermost to close under the advancement of the piston 3. This leads to the positive oxidation of the unburned components without supplying an excess of secondary air and inordinate reduction in exhaust gas temperature.

Figure 5:
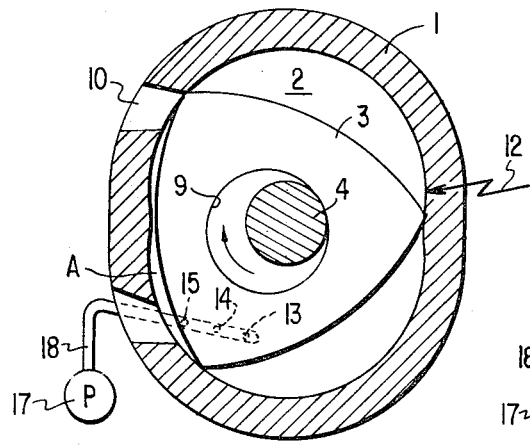
FIG. 5 is a view similar to that of FIG. 2 showing the position of the rotary piston with all three nozzles closed.

Referring next to FIG. 5, with a resultant decrease of the gas to be exhausted in the operating chamber A upon further rotation of piston 3, the nozzles 14 and 15 are closed in turn and at the end of the exhausting step, the nozzles 13, 14 and 15 are all closed preventing secondary air from flowing into the operating chamber at the succeeding intake step and thereby dilute the intake fuel and air mixture.

Figure 6:
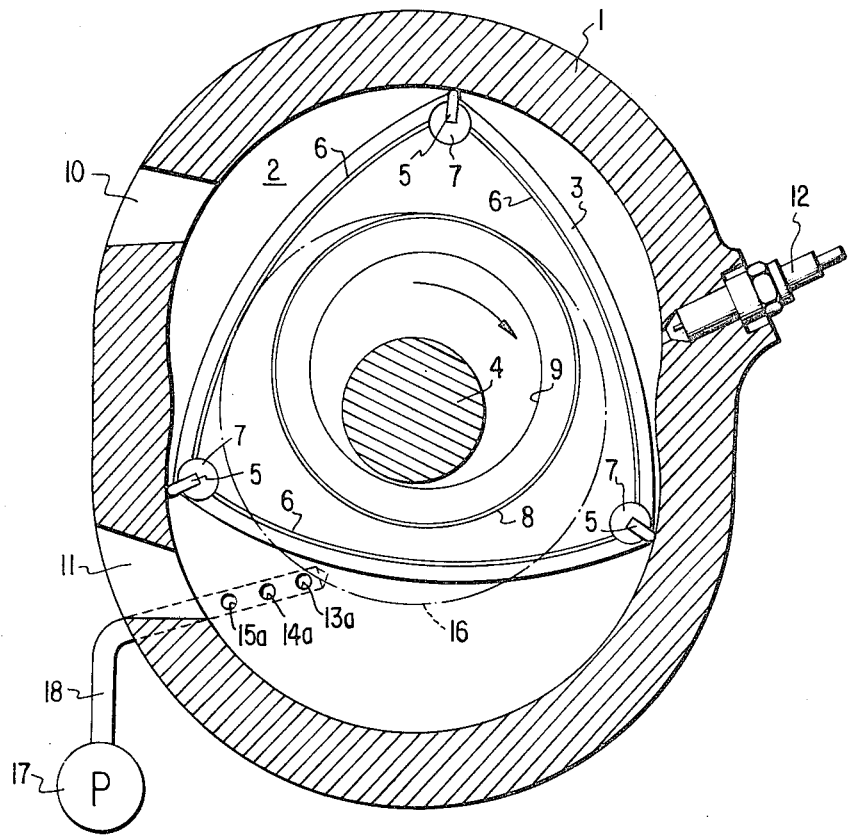
FIG. 6 is a vertical sectional view of a rotary piston internal combustion engine according to another embodiment of the present invention.

An alternate form of the invention is shown in FIG. 6. FIG. 6 illustrates a vertical sectional view of a rotary piston internal combustion engine which is different from the first embodiment by the arrangement and disposition of the nozzles and their operating sequence, but in all other respects are similar to the first embodiment.

Figure 8:
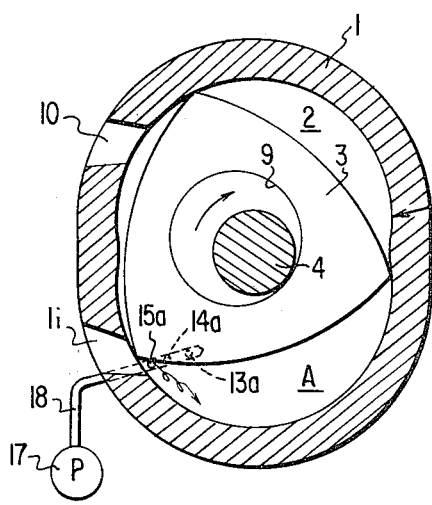
FIG. 8 is a view similar to that of FIG. 7 where the intermediate nozzle is about to open.
Figure 7:
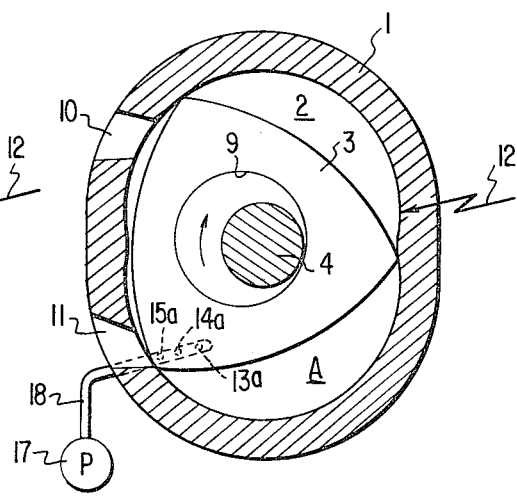
FIG. 7 is a diagrammatic view similar to that shown in FIG. 6 with the outermost nozzle about to open as a result of rotation of the rotary piston.
Figure 9:
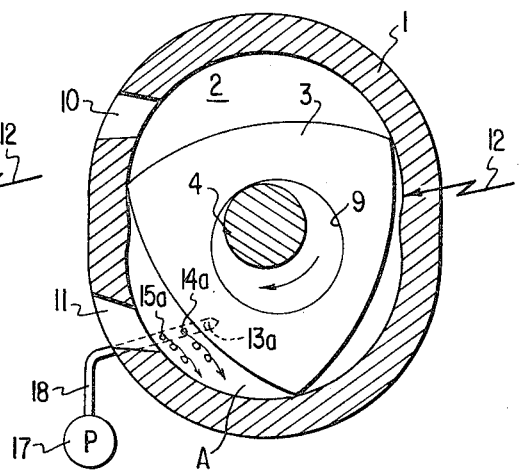
FIG. 9 is a view similar to that of FIG. 7 with the rotary piston in a position to close the innermost nozzle.

Nozzles 13a, 14a and 15a extend in a radially outward sequence and are positioned on the inner surface of the side wall 2. It follows that with the rotative motion of the piston 3, the nozzles are open in utrn from the radially outermost nozzle 15a inwards. With the rotary piston 3 continuing to rotate, the nozzles are closed in turn from the radially innermost nozzle 13a through nozzles 14a and 15a in response to the advnacement of the exhaust step. The sequence is shown in FIGS. 7 through 9 inclusive. Referring particularly to FIG. 7, at the end of the expansion step of the rotary piston internal combustion engine, all nozzles 13a, 14a and 15a are closed but at the beginning of the exhaust step, the nozzles are opened in sequence from the radially outermost nozzle 15a through nozzle 14a and 13a, the sequence being shown in FIGS. 8 and 9.

Figure 10:
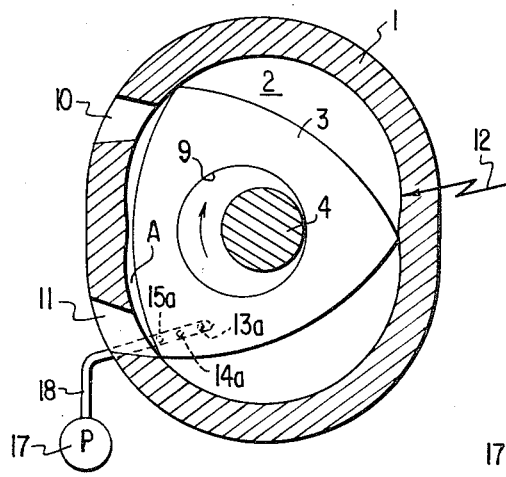
FIG. 10 is a view similar to that of FIG. 7 with the rotary piston in a position in which all nozzles are closed.

Turning next to FIG. 10, at the end of the exhaust step all of the nozzles 13a, 14a and 15a are closed. Thus, in similar fashion to the operation of the first embodiment, appropriate secondary air is injected into the operating chamber in response to the advancement of the exhaust step resulting in positive oxidation and burning of the unburned component or components of the gas.

It is apparent from the foregoing description, that the present invention may effectively eliminate the detrimental unburned components of the exhaust gas by oxidizing and burning the same by an extremely simple structure which insures that the proper amount of secondary air is automatically injected into the exhaust gas, which is maintained at high temperature; the operation being fully responsive to the advancement of the rotary piston through the exhaust step of the combustion cycle.

Although the above description is relatively simple and that in each embodiment three nozzles eject secondary air, and the nozzles are on one side wall of the engine, nozzles may be provided on both side walls and any number of nozzles may be provided without departing from the spirit and principle of the present invention.

It will also be understood by those skilled in the art from the foregoing description, that the disposition, arrangement, number, shape and other features of the nozzles may be appropriately selected in response to the requirements of the engine such as by testing, and the nozzles may be of such a shape that they are in turn closed or opened due to rotation of the rotary piston and may not be necessarily disposed in the straight line fashion shown in the illustrated embodiments. It will be understood that various changes in the details, materials and arrangement of parts which have been described herein and illustrated in order to explain the nature of this invention may be made by those skilled in the art within the principle and scope of the invention as expressed in the following claims.

It will be further understood that the "Abstract of the Disclosure" set forth above is intended to provide a nonlegal, technical statement of the contents of the disclosure in compliance with the Rules of Practice of the United States Patent Office, and is not intended to limit the scope of the invention described and claimed therein.

What is claimed is:

1. In a rotary piston internal combustion engine including a peripheral housing having an epitrochoidal inner surface, side walls disposed on both sides of said peripheral housing, a rotary piston having arcuate flanks of triangular shape, means for rotating tht piston in planetary movement within said peripheral housing, an oil seal carried by said rotary piston and surrounding a central opening of said piston so as to prevent oil from leaking radially outwards through the space between the side wall and the rotary piston, suction and exhaust ports provided at predetermined locations within said peripheral housing and ignition means for igniting the fuel and air mixture, the improvement comprising: a plurality of nozzles provided on the inner surface of at least one of said side walls for injecting secondary air into operating chambers formed between the rotary piston and the inner surface of the peripheral housing, said nozzles being positioned radially outside of the trace of said oil seal on said side wall and so disposed as to be opened and closed in turn by movement of the rotary piston as it rotates in planetary fashion.

2. The rotary piston internal combustion engine as claimed in claim 1 wherein said nozzles are so positioned that the first nozzle to open starts to open at the same time that said exhaust port opens.

3. The rotary piston internal combustion engine as claimed in claim 1 wherein said nozzles are disposed on the inner surface of only one of said side walls.

4. The rotary piston internal combustion engine as claimed in claim 1 wherein said nozzles are disposed at different radial positions on said housing wall, and said radially outermost nozzle opens first during planetary rotation of said piston.

5. The rotary piston internal combustion engine as claimed in claim 1 wherein said nozzles are disposed within said side walls at radially spaced positions such that the radially innermost nozzle opens first during planetary rotation of said rotary piston.

6. The rotary piston internal combustion engine as set forth in claim 1 wherein three nozzles are provided in straight line fashion.

7. The rotary piston internal combustion engine as set forth in claim 4 wherein three nozzles are disposed in straight line fashion on the inner surface of one of said side walls.

8. The rotary piston internal combustion engine as claimed in claim 5 wherein three nozzles are disposed in straight line fashion on the inner surface of one of said side walls.

References Cited
UNITED STATES PATENTS 3,359,722  12/1967  Sebestyen _____ 60—30
3,464,394  9/1969  Satoh _____ 123—8X ALLAN D. HERRMANN, Primary Examiner U.S. Cl. X.R.
60—30; 123—845